United States Patent
Richards

[11] Patent Number: 5,558,436
[45] Date of Patent: Sep. 24, 1996

[54] THERMALLY ISOLATED ROOM TEMPERATURE SENSING APPARATUS

[75] Inventor: Michael F. Richards, Carol Stream, Ill.

[73] Assignee: Landis & Gyr, Inc., Buffalo Grove, Ill.

[21] Appl. No.: 275,043

[22] Filed: Jul. 14, 1994

[51] Int. Cl.⁶ .................. G01K 1/00; G01K 7/00
[52] U.S. Cl. ............ 374/208; 374/109; 374/183; 165/257; 236/DIG. 19
[58] Field of Search ................. 374/100, 101, 374/109, 120, 183, 185, 208, 209; 236/DIG. 19, 46 R; 165/28, 135; 337/327, 380, 398

[56] References Cited

U.S. PATENT DOCUMENTS

| | | | |
|---|---|---|---|
| 2,160,623 | 5/1939 | Persons | 374/208 |
| 2,250,231 | 7/1941 | Nodine | 374/208 |
| 3,238,338 | 3/1966 | Nelson | 236/DIG. 19 |
| 3,926,053 | 12/1975 | Schurrer et al. | 374/120 |
| 3,998,384 | 12/1976 | Martin et al. | 236/DIG. 19 |
| 4,659,236 | 4/1987 | Hobbs | 374/208 |
| 5,008,775 | 4/1991 | Schindler et al. | 236/DIG. 19 |
| 5,022,766 | 6/1991 | Phipps | 236/DIG. 19 |
| 5,040,541 | 8/1991 | Poppendiek | 374/31 |

FOREIGN PATENT DOCUMENTS 274077  7/1988  European Pat. Off. .............. 374/100

Primary Examiner—William A. Cuchlinski, Jr.
Assistant Examiner—Andrew Hirshfeld
Attorney, Agent, or Firm—Greer, Burns & Crain, Ltd.

[57] ABSTRACT

A thermally isolated flush mounted room temperature sensing apparatus has a sensor assembly with sensor elements mounted on a printed circuit board and generates a value that is indicative of the sensed temperature. The apparatus has a generally sealed box structure with a wall plate attached to an open end of the box structure, and the sensor assembly extends through an opening in the wall plate. The assembly is mounted to an insulating block located in the box structure and is supported by spring retainers to have the assembly float away from the block to provide thermal isolation. Other thermal isolating features are provided.

15 Claims, 2 Drawing Sheets

THERMALLY ISOLATED ROOM TEMPERATURE SENSING APPARATUS

The present invention generally relates to temperature sensing apparatus and more particularly relates to a thermally isolated room temperature sensors that are particularly adapted to be flush mounted in a wall.

While wall mounted temperature sensors and thermostats have existed for many years, including both surface and flush mounted versions, such flush mounted temperature sensors have been prone to providing inaccurate measurements of the room air temperature because of the influence of the temperature of the surrounding structure. Also, flush mounted temperature sensors are typically mounted in electrical boxes, such as switch boxes or four inch square boxes, and are sometimes merely mounted on plaster ring structures that fit an opening in the wall. Because there is often air movement within the wall and/or electrical conduit, there has been a detrimental influence on the accuracy of the sensor because the temperature of the components and the air behind the sensor. Additionally, these detrimental influences have also often reduced the response time in sensing changes in the room air temperature.

Prior art sensors have attempted to increase the reliability of flush mounted temperature sensor, i.e., the response time and accuracy, by mounting the sensing elements on stainless steel plates to reduce wall temperature effects, and also to cover the sensing element with a thin pad of insulating material to reduce the effect of temperatures behind the surface on which the sensors are to be mounted. Such attempts have not been particularly successful.

Accordingly, it is a primary object of the present invention to provide an improved room temperature sensing apparatus which provides superior thermal isolation, and which results in improved response time and accuracy.

Another object of the present invention is to provide such an improved room sensing apparatus by utilizing a combination of thermal isolation features to substantially reduce the detrimental effect of wall structure temperatures, which are different from the room air temperature, from influencing the sensed room air temperature.

A related object is to reduce the effect of air temperature within the wall or the electrical box to which the apparatus is mounted, which is different from the room air temperature, from influencing the sensed air temperature.

Yet another object of the present invention is to provide such an improved room temperature sensing apparatus which is fabricated with easily manufactured components, and which is inexpensive to manufacture, and yet is accurate and fast acting.

Still another object of the present invention is to provide such an apparatus which is also capable of being quickly and easily installed, i.e., it can be placed in an electrical box after having a pair of conductors connected to a jack and be secured by screwing-in two captive screws.

Other objects and advantages of the present invention will become apparent upon reading the following detailed description while referring to the attached drawings, in which.

DETAIL DESCRIPTION

Figure 1:
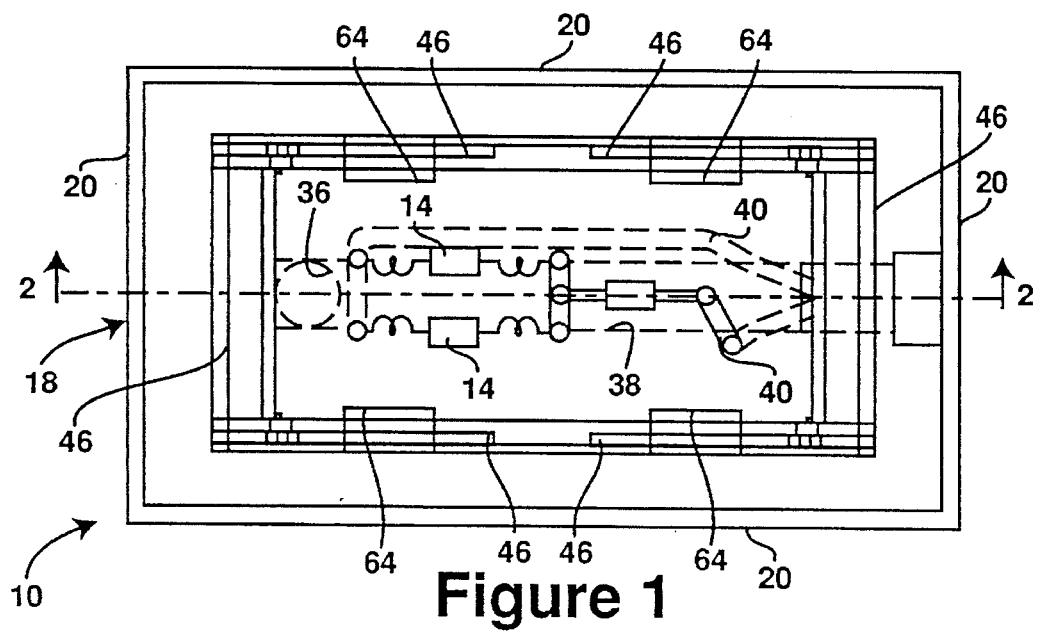
FIG. 1 is a plan view of the room temperature sensing apparatus of the present invention illustrating some internal structure as if portions were removed.

Broadly stated, the present invention is an improved room temperature sensing apparatus which has superior thermal isolation characteristics. The apparatus utilizes a sensor assembly that has one or more sensing elements that are connected to a printed circuit board and the assembly generates a resistance level that is indicative of the temperature sensed by the sensing elements. The sensor element comprises a temperature responsive thermistor and the circuitry present on the printed circuit board provides a resistance level that is proportional to the temperature.

The apparatus utilizes a unique design to provide thermal barriers to the influence of temperature gradients other than the room temperature air that is to be sensed. The undesirable influences can be caused by a different temperature of the wall in which the apparatus is installed, the temperature of metal electrical construction box in which the apparatus is mounted and the electrical conduit that may be run to the box, the inner wall air temperature and the like.

Turning now to the drawings, and particularly FIGS. 1–4, the room temperature sensing apparatus of the present invention is indicated generally at 10, and includes a temperature sensing assembly, indicated generally at 12, which has a sensing element 14 mounted to a printed circuit board 16. The assembly has an aluminum cover 17 which is visible and which is thermally coupled to the sensing element 14 by means of direct contact and a thermally conductive compound that is applied to the element 14 when the cover 17 is applied. The apparatus has a box structure, indicated generally at 18, which has four side walls 20 and a bottom wall 22. The apparatus includes a wall plate 24 (FIG. 4) which is attached to the open end opposite the bottom 22. The box structure 18 is preferably made of plastic as is the wall plate 24 and the box structure and wall plate are preferably ultrasonically welded together to produce an air tight barrier at the interface. This prevents ally convection flow between the two from inside of the electrical box or wall that could cause an inaccurate reading by the sensing elements 14.

The wall plate 24 has an opening 26 through which a portion of the sensing assembly 12 passes, and the size of the opening is preferably slightly larger that the size of the portion so that an air gap exists between the two completely around the portion to eliminate the possibility of thermal conduction from the wall plate and the sensing assembly 12. The wall plate 24 has two openings through which mounting screws 28 are located, with the screws having conventional retainers 30 so that the screws will not be lost. The distance between the two screws 28 are preferably conventional so that the apparatus can be mounted on conventional electrical boxes, plaster rings and the like.

Figure 2:
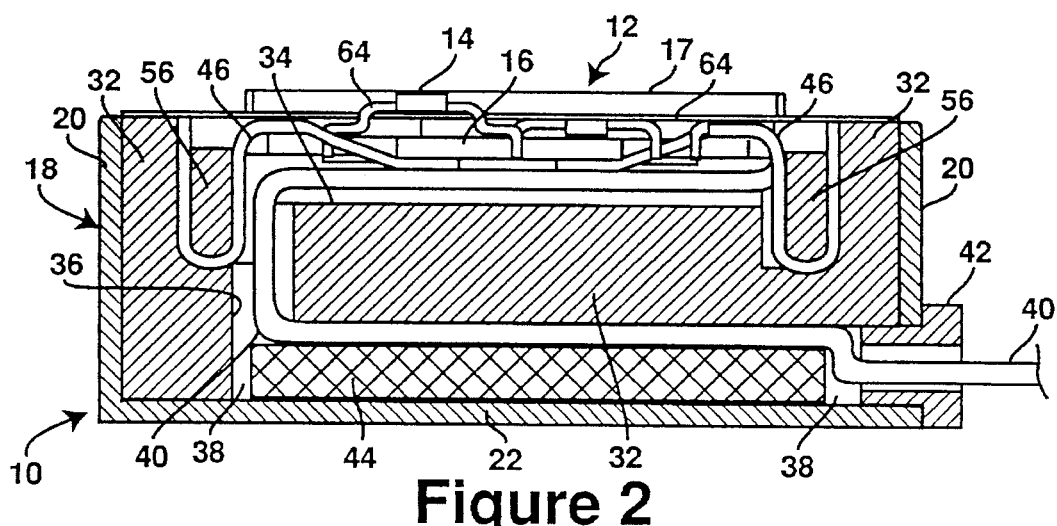
FIG. 2 is a cross section taken generally along the line 2—2 in FIG. 1.

In accordance with an important aspect of the present invention, a block of insulating material 32 is located in the box structure 18 for providing a thermal barrier between the side and bottom walls 20, 22 and the sensing assembly 12. The block 32 is preferably rigid and made of Styrofoam or other rigid insulating material. The block has a recess or depression 34 adapted to receive the assembly 12 and also has an internal port 36 communicating the recess 34 with another recess 38 located in the opposite surface. The port 36 and recess 38 define a raceway for a pair of conductors 40 that extend from the assembly 12 to the outside of the box structure. The conductors 40 can be connected to a jack 41, such as a RJ11 jack, for example. The conductors exit an opening in the side wall 20 as shown in FIG. 2, and a bushing 42 is provided to minimize any flow of air through the opening and thereby reduce thermal convection. Also, an insulating cord 44 is provided in the recess 38 overlying the conductors 40 to provide an added thermal barrier.

The conductors 40 do not pass from the bushing 42 to the sensor assembly 12 in the most direct route, but pass through the extended length of the recess 38, the port 36 and back toward the right of the assembly 12 as shown in FIG. 2. This added length coupled with the fact that the conductors are preferably made of Constantan wire, which has good thermal resistance properties, reduces the heat transfer through the wires as is desired.

Figure 5:
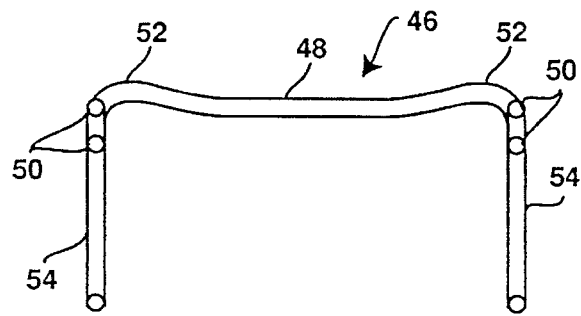
FIG. 5 is an end view of one of the spring retainer clips that are a part of the present invention.
Figure 6:
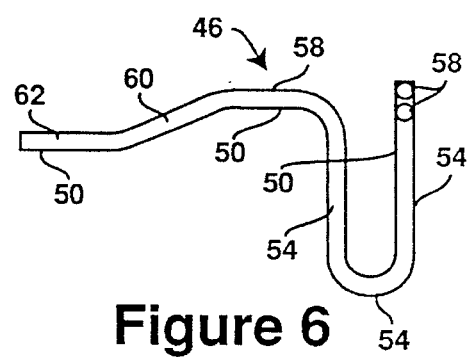
FIG. 6 is a side view of the retainer clip shown in FIG. 5.
Figure 7:
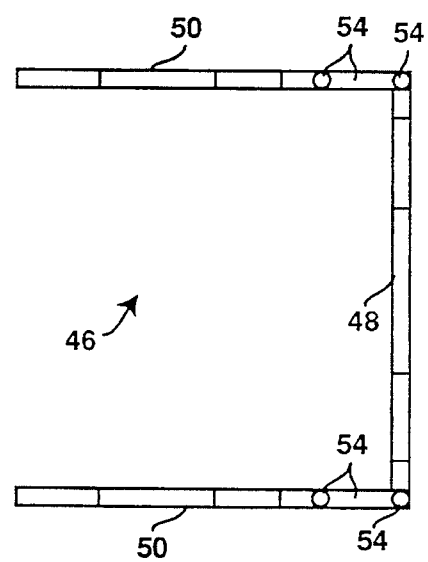
FIG. 7 is a top view of the retainer clip shown in FIG.

In accordance with another important aspect of the present inventions the sensor assembly 12 is supported indirectly by the block and is held in place by two pairs of retainer clips, indicated at 46, one of which is shown in FIGS. 5, 6 and 7. The sensor assembly is effectively floated in spaced relation to the block 32 by the retainer clips 46 to further minimize heat transfer from the block 32.

Figure 3:
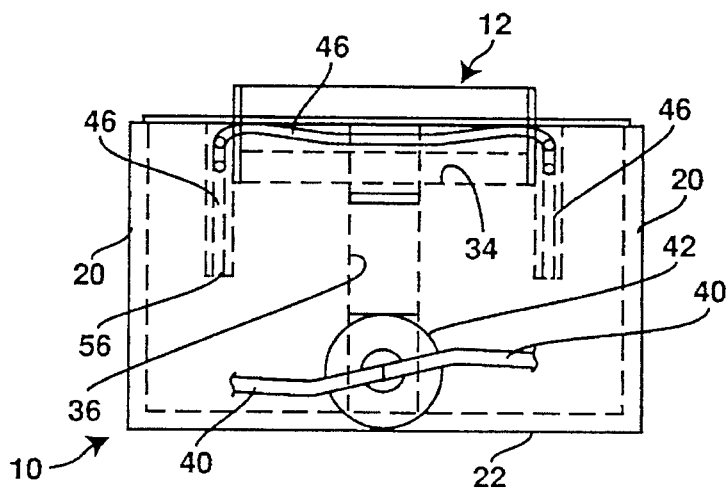
FIG. 3 is an end view taken generally from the right side of FIG. 2, and illustrating some internal structure as if portions were removed.
Figure 4:
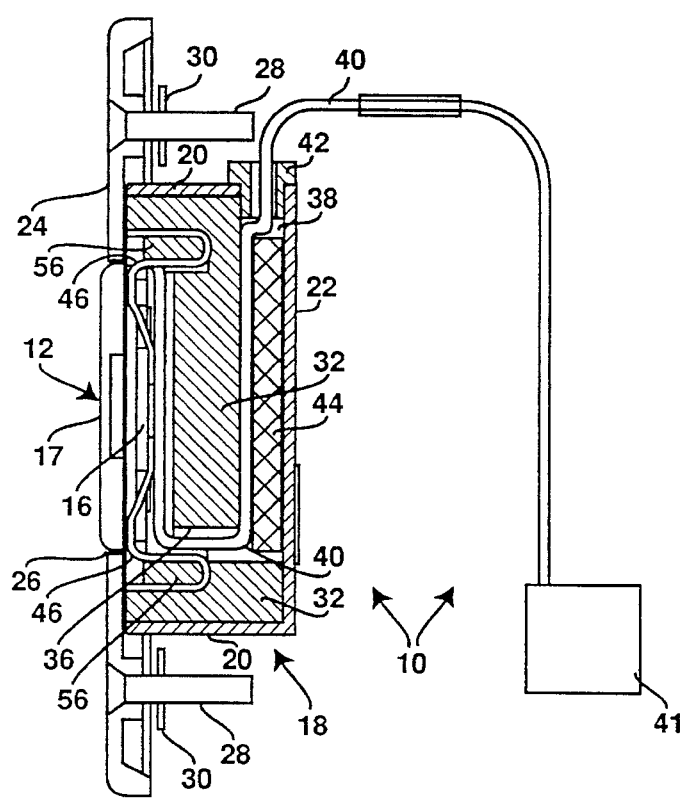
FIG. 4 is a cross section, similar to FIG. 2, but including a wall plate as well as added electrical components.

Each of the clips have a bridging portion 48 and two end portions, with the bridging portion 48 having a lower center so that two uppermost extending points 52 are defined as best shown in FIG. 5. These points 52 provide the only contact of the clips with the inside of the wall plate 24, as is best shown in FIGS. 2 and 4. The end portions of each of the clips also have a transverse loop 54 which defines an extended path for minimizing heat transfer from the wall plate 24 to the sensor assembly 12 through the clips 46, as is desired. The loops 54 fit within deeper recesses 56 in the block 32 as best shown in FIG. 3.

The ends 50 of the clips 46 also have a high horizontal portion 58 as shown in FIG. 6, a sloped portion 60 and a lower end 62. The ends are connected to the sensor assembly by being passed through slots 64 in the printed circuit board so that the end 62 is in contact with the underside of the board, the sloped portion 60 is located in the slot 64 and the portion 58 contacts the upper side of the board 16. As is best shown in FIGS. 2 and 4, there are recesses 56 for accommodating loops 54 inserted into the inside of the block 32. In FIGS. 2 and 3 four recesses are shown at the corners of recess 34. The cover 17 has downwardly extending retaining legs (not shown) which are adapted to be inserted into the slots 64 and which hold the cover in place. These legs are bent inward toward the center of the printed circuit board 16 to hold the cover in place.

From the foregoing detailed description, it should be understood that an improved room temperature sensing apparatus has been shown and described which has many desirable attributes. The apparatus can be flush mounted in conventional electrical boxes and is adapted to provide accurate and fast acting temperature sensing as a result of its unique design.

While various embodiments of the present invention have been shown and described, it should be understood that various alternatives, substitutions and equivalents can be used, and the present invention should only be limited by the claims and equivalents of the claims.

Various features of the present invention are set forth in the following claims.

What is claimed is:

1. A thermally isolated room temperature sensing apparatus of the type which is adapted to be wall mounted, comprising:

enclosure means having a generally flat from plate with at least one opening for positioning the outer portion of a sensor assembly, said enclosure means including a box structure having sides, a top and a bottom, said box structure being generally closed on its sides and bottom, said front plate covering the top thereof;

said sensor assembly adapted to sense the temperature of the immediate area in which it is located and generates a value representative of the sensed temperature, said sensor assembly being adjacent said opening and having an exposed thermally conductive surface generally coplanar with said front plate and positioned to sense the temperature of the air;

thermal isolating means located in said enclosure means adapted to minimize the thermal effects of air that is present outside of said box structure, said thermal isolating means including insulating means located in said box structure generally between said sensor assembly and said box structure sides and bottom and a mounting means attached to said insulating means and said sensor assembly for holding said sensor assembly in said enclosure means; and conducting means connected to said sensor assembly and being adapted to conduct electrical signals exteriorly of said enclosure means;

said insulating means comprising at least one block of solid insulating material having a first recess for retaining said sensor assembly, and a second recess for carrying said conducting means from said sensor assembly to a second opening in one of said bottom and one of said sides, said first recess being larger than said sensor assembly, said mounting means holding said sensor assembly spaced away from said insulating material;

said mounting means comprises a pair of spring retainer clips, each of which have a pair of end portions and a bridging portion, said bridging portion being adjacent to said front plate and said end portions being connected to said sensor assembly, each of said end portions having an extended loop for providing an elongated path between the bridging portion and said sensor assembly for providing a thermal barrier between said bridging portion and said sensor assembly.

2. A temperature sensing apparatus as defined in claim 1 wherein said insulating material Styrofoam.

3. A temperature sensing apparatus as defined in claim 1 wherein said conducting means comprises a pair of constantin wires that extend from said sensor assembly to the exterior of said box structure through said second opening therein.

4. A temperature sensing apparatus as defined in claim 3 wherein said conducting means further comprises a jack connector for conducting said signals to a remote location.

5. A temperature sensing apparatus as defined in claim 3 wherein said second recess extends through said insulating material in an extended path to increase the thermal barrier between the outside of said box structure and said sensor assembly.

6. A temperature sensing apparatus as defined in claim 1 wherein said at least one opening in said front plate is a single opening through which a portion of said sensor assembly extends.

7. A temperature sensing apparatus as defined in claim 6 wherein the outside periphery of said portion of said sensor assembly is slightly smaller than the inside of said opening in said plate to thereby provide a small air gap to minimize the thermal conductivity from said from plate to said sensor assembly.

8. A temperature sensing apparatus as defined in claim 1 wherein said sensor assembly comprises a printed circuit board and at least one temperature sensing element mounted thereto.

9. A temperature sensing apparatus as defined in claim 1 wherein said front plate is connected to said box structure in a substantially sealed connection to minimize any flow of air between said front plate and said box structure.

10. A temperature sensing apparatus as defined in claim 9 wherein said front plate and said box structure are made of a plastic material and said substantially sealed connection is provided by ultrasonic welding at the interface between said front plate and said box structure.

11. A temperature sensing apparatus as defined in claim 1 wherein said second recess has a portion that is adjacent the bottom of said box structure, said apparatus having an insulation cord located in at least said portion of said second recess, said insulation cord overlying said conducting means.

12. A temperature sensing apparatus as defined in claim 1 wherein said front plate has length and width dimensions that are larger that the length and width dimensions of said box structure, thereby providing an outer flange that is adapted to facilitate mounting of the apparatus to an electrical box.

13. A temperature sensing apparatus as defined in claim 1 wherein said value representative of the sensed temperature is a resistive value.

14. A thermally isolated room temperature sensing apparatus of the type which is adapted to be generally flush mounted in a wall, said apparatus comprising:

enclosure means having a wall plate with at least one opening for communicating air therethrough, said enclosure means including a box structure having sides and a bottom, said box structure being generally closed on its sides and bottom, said wall plate covering the top thereof and having a flange extending beyond the periphery of said box structure and mounting means associated with said flange adapted to connect said apparatus to an electrical box;

a sensor assembly having temperature sensing elements adapted to sense the temperature of the immediate area in which it is located and generates a value signal representative of the sensed temperature, said sensor elements being adjacent said opening and positioned to sense the temperature of the air being communicated therethrough;

thermal isolating means located in said enclosure means adapted to minimize the thermal effects of air that is present on the outside of the sides and bottom of said box structure, said thermal isolating means including insulating means located in said box structure generally between said sensor assembly and said box sides and bottom and a metal spring retainer clip attached to said insulating means and said sensor assembly for holding said sensor assembly in said enclosure means; and, conducting means connected to said sensor assembly and being adapted to conduct electrical signals exteriorly of said enclosure means.

15. A thermally isolated room temperature sensing apparatus as defined in claim 14 wherein said value representative of the sensed temperature is a resistive value.

* * * * *

UNITED STATES PATENT AND TRADEMARK OFFICE
CERTIFICATE OF CORRECTION

PATENT NO. : 5,558,436
DATED : September 24, 1996
INVENTOR(S) : Michael F. Richards It is certified that error appears in the above-indentified patent and that said Letters Patent is hereby corrected as shown below:

Column 2, line 7, after "FIG." insert --5. --

Column 2, line 46, delete "ally" and insert --any--.

Column 4, line 5, delete "from" and insert --front--.

Column 4, line 50, after "material" insert --is--.

Column 6, line 3, after "sides" insert --, a top--.

Signed and Sealed this

Nineteenth Day of August, 1997

*Attest:*

BRUCE LEHMAN

*Attesting Officer*      Commissioner of Patents and Trademarks